United States Patent [19]

Casse et al.

[11] Patent Number: 4,874,350

[45] Date of Patent: Oct. 17, 1989

[54] TORSIONAL DAMPER DEVICE COMPRISING TWO COAXIAL PARTS COOPERATING WITH CIRCUMFERENTIALLY ACTING SPRINGS

[75] Inventors: Pierre Casse, Ermont; Gustave Chasseguet, Taverny, both of France

[73] Assignee: Valeo, Paris, France

[21] Appl. No.: 86,800

[22] Filed: Aug. 19, 1987

[30] Foreign Application Priority Data

Aug. 21, 1986 [FR] France ................................. 86 11936

[51] Int. Cl.⁴ ............................. F16D 3/66; F16D 7/02
[52] U.S. Cl. ................................... 464/68; 192/106.1; 192/106.2; 464/66
[58] Field of Search ........................ 192/106.2, 106.1; 464/68, 66, 46

[56] References Cited

U.S. PATENT DOCUMENTS

| | | | |
|---|---|---|---|
| 1,693,765 | 12/1928 | Parsons et al. | 74/574 X |
| 3,327,820 | 6/1967 | Maurice | 192/106.2 X |
| 4,274,524 | 6/1981 | Nakane | 192/48.3 |
| 4,663,983 | 5/1987 | Kobayashi et al. | 74/574 |
| 4,714,449 | 12/1987 | Woerner et al. | 192/106.2 X |
| 4,767,380 | 8/1988 | Chasseguet et al. | 464/68 |

FOREIGN PATENT DOCUMENTS

| | | |
|---|---|---|
| 0259173 | 3/1988 | European Pat. Off. ......... 192/106.2 |
| 2571461 | 4/1986 | France . |
| 2576985 | 8/1986 | France . |
| 2083592 | 3/1982 | United Kingdom . |
| 2123925 | 2/1984 | United Kingdom . |

*Primary Examiner*—Rodney H. Bonck
*Attorney, Agent, or Firm*—Charles E. Brown; Charles A. Brown

[57] ABSTRACT

A torsional damper device comprises coaxial first and second parts which rotate relative to each other to a limited degree. The first part comprises two substantially parallel annular flanges and pivoted base members. Two parallel plates on the second part are disposed axially between the two flanges. They have at least one pair of radial arms comprising parallel and substantially circumferential fingers. Springs are disposed substantially circumferentially between the base members. The base members comprise on a surface opposite that in contact with the respective spring rounded recesses in which the fingers engage on relative rotation between the two coaxial parts. A rotational coupling device constrains the plates to rotate together and establishes a circumferential corresponding relationship between the radial arms and their fingers.

6 Claims, 2 Drawing Sheets

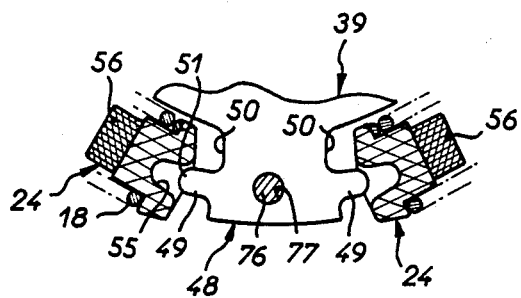
FIG. 2
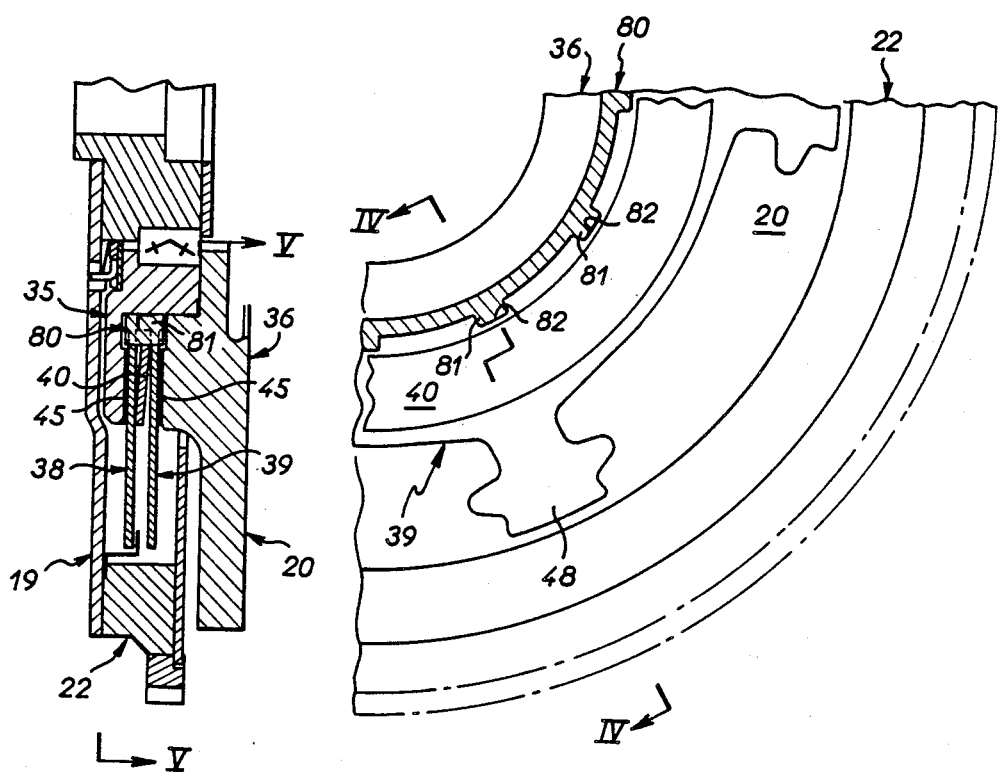
FIG. 4
FIG. 5

TORSIONAL DAMPER DEVICE COMPRISING TWO COAXIAL PARTS COOPERATING WITH CIRCUMFERENTIALLY ACTING SPRINGS

BACKGROUND OF THE INVENTION

1. Field of the invention

The invention concerns a torsional damper device for torque transmission systems, such as clutches, of the type comprising two coaxial parts respectively cooperating with circumferentially acting springs to absorb variations in the torque.

The invention is more particularly concerned with the structure of engagement means between one of the coaxial parts and pivoting base members on which said springs are mounted.

2. Description of the prior art

A torque transmission system such as a friction clutch designed to be inserted between the crankshaft of the motor and the input shaft of the gearbox in an automobile vehicle usually comprises a torsional damper device adapted to absorb variations in this torque to avoid vibration and in particular audible vibration arising at any point along the kinematic system in which said torsional damper device is inserted. A damper device of this kind is often combined with the friction disk of the clutch or with the inertia flywheel driven by the crankshaft of the motor and also serving as a reaction plate for the clutch.

French patent No. 2 571 461 describes a torsional damper device of this kind combined with an inertia flywheel. The flywheel comprises two coaxial parts between which are circumferentially disposed helical coil springs. To be more precise, each spring is held between base members pivotally mounted between two flanges (also called guide rings) of a first part, in this instance the driving part, while the same base members are adapted to be loaded circumferentially with the possibility of articulation by annular metal plates fastened to the driven part, variation in the compression of the springs absorbing variations in torque and procuring some degree of filtering of vibrations of all kinds.

Two parallel plates are provided, at a short axial distance from each other, this arrangement forming a torque limiter.

This assembly gives good results, principally because of the inclusion of the pivoted base members which enable the springs to function under optimum conditions by preventing them being subjected to excessive radial deformation inwards or outwards. The base members are molded from a relatively rigid plastics material.

However, it has been noticed that under certain operating conditions the two plates aforementioned could become offset circumferentially and not enter simultaneously into contact with the base members. Apart from incorrect functioning of the springs, this can lead to deterioration of these base members. This malfunctioning can go so far as to result in skewing of a base member, leading to its rapid destruction. An object of the invention is to resolve this difficulty.

SUMMARY OF THE INVENTION

The invention consists in a torsional damper device comprising coaxial first and second parts adapted to rotate relative to each other to a limited degree, two substantially parallel annular flanges and pivoted base members on said first part, two parallel plates on said second part disposed axially between said two flanges and having at least one pair of radial arms comprising parallel, substantially circumferential fingers, springs disposed substantially circumferentially between said base members, a surface on each base member opposite that in contact with the respective spring, rounded recesses in said surfaces in which said fingers engage on relative rotation between said two parts, and rotational coupling means for constraining said plates to rotate together and adapted to establish a circumferential correspondence between said radial arms of said at least one pair and said fingers thereof.

The invention will be better understood and its other advantages will emerge more clearly from the following description of two embodiments of torsional damper device in accordance with the principle of the invention, given by way of example only and with reference to the appended drawings.

BRIEF DESCRIPTION OF THE DRAWINGS

FIG. 2 is a detail view in cross-section on the line II—II in FIG. 1.

FIG. 4 is a partial view of a second embodiment seen in half-section on the line IV—IV in FIG. 5.

FIG. 5 is a partial cross-section on the line V—V in FIG. 4, the circumferentially acting springs and their base members having been omitted to simplify the drawing.

DESCRIPTION OF THE PREFERRED EMBODIMENTS

Figure 1:
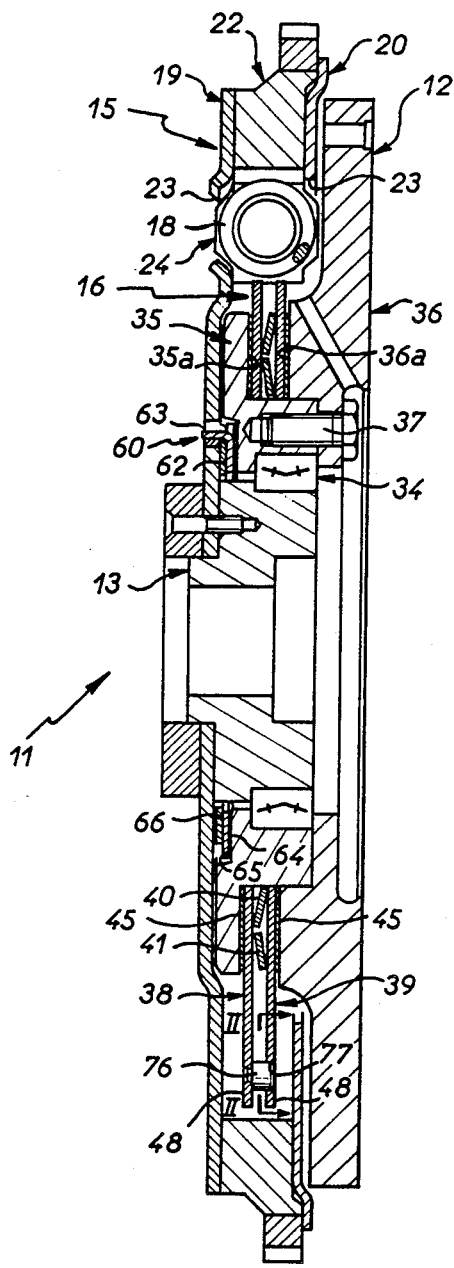
Figure 1 is a general view of a torsional damper device forming an inertia flywheel incorporating the improvements of the invention and shown in cross-section.
Figure 3:
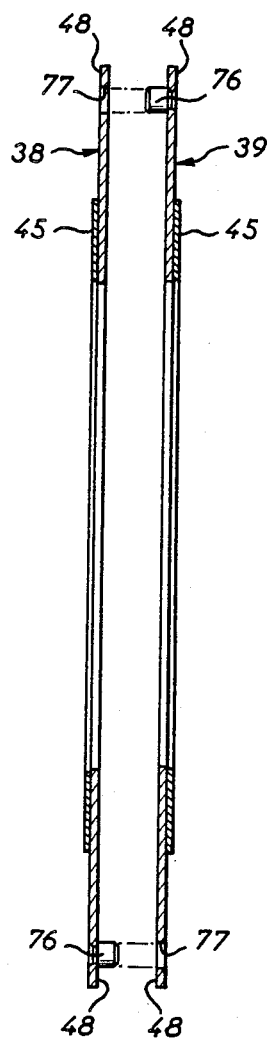
FIG. 3 is a detail view of the aforementioned plates in diametral cross-section, showing how they fit together.

Referring more particularly to FIGS. 1 through 3, there is shown an inertia flywheel forming a torsional damper device 11 for an automobile vehicle transmission, the flywheel comprising an annular contact surface 12 so that it can additionally serve as the reaction plate in a friction clutch. To this end, the flywheel 11 is designed to be fixed by its hub 13 to the crankshaft of the internal combustion engine of the automobile vehicle. It comprises two coaxial parts 15 and 16 which will be referred to hereinafter as the first and second parts, respectively, mounted so as to be able to rotate relative to each other to a limited degree against, in particular, the force exerted circumferentially between them by helical coil springs 18. The first or driving part 15, of which the hub 13 forms part, comprises two annular metal flanges 19, 20 usually called "guide rings". The flange 19 is fixed to the hub 13. The flange 20, parallel to the flange 19, is fixed to it at the outside through an interposed massive annular spacer 22 carrying the starter ring. In the conventional way, these flanges comprise circumferentially elongate windows 23. Each window in one flange faces a symmetrical window in the other flange in such a way as to define housings adapted to accommodate the springs 18. Each spring 18 is mounted in a housing of this kind through the intermediary of two end base members 24. Each base member 24 is mounted in such a way as to be able to pivot to a limited degree between the flanges 19 and 20 to which it is pivoted about an axis parallel to the rotation axis of the damper flywheel.

The second part 16 is mounted to rotate on the hub 13 by means of a ball bearing 34 and comprises an annular member 35 forming a sort of hub and a plate 36 fixed to the annular member 35 by screws 37. This plate constitutes the reaction plate of the clutch since its external radial surface forms the annular contact surface 12 against which the friction clutch (not shown) is placed.

The annular member 35 and the plate 36 comprise respective parallel radial annular bearing surfaces 35a and 36a and two parallel plates 38, 39 stamped out from sheet metal are inserted into the space defined by these two annular bearing surfaces and pushed axially towards them by axially acting spring means, in this instance two Belleville washers 40 and 41. In this instance the bearing surface 35a is formed on a flange on the member 35 extending radially towards the spacer 22 and centering the plates 38, 39. Each plate carries an annular friction facing 45 through which it is in rubbing contact with the corresponding radial annular bearing surface. The plates disposed axially between the two annular flanges 19, 20 are adapted to cooperate with the base members 24 of the springs (in a way that will be described in more detail below) and the arrangement that has just been described constitutes a torque limiter permitting rotary slipping between said coaxial first and second parts if the torque transmitted exceeds a predetermined value. Each plate 38, 39 comprises a flat annular part carrying the facings 45 extended outwardly by radial arms 48 (equal in number to the springs) constrained to move circumferentially between the springs. Each arm 48 is provided with two oppositely directed fingers 49 extending substantially circumferentially and projecting from two respective, substantially radial edges 50 of said arm. Each finger 49 has a rounded end 51 adapted to come into pivoting contact with the rounded bottom of a recess 55 on the corresponding base member. The base members are molded from a plastics material but carry elastomer material blocks 56 serving as spring abutment members in the event of excessive torque leading to excessive compression of the springs.

As FIG. 2 shows, the springs are not operative at the beginning of relative annular displacement between the two coaxial parts, since the radial arms have to achieve a certain angular travel before certain of their fingers engage in the recesses in the corresponding base members. Before said fingers engage in the bottom of said base members friction means 60 provided between said coaxial parts are operative as soon as relative angular displacement between the two coaxial parts begins. These friction means comprise a friction ring 62 and a Belleville washer 66 serving as a spring. The friction ring 62 is prevented from rotating relative to the first part 15 by axial lugs 63 inserted in holes in the flange 19. It carries a friction facing 64 pressed axially against a shoulder 65 on the annular member 35 of the second part 16. The friction ring is urged towards said shoulder by the Belleville washer 66 operative between it and the flange 19.

In accordance with the invention, means are provided for constraining the plates 38 and 39 to rotate together, and are arranged to secure and maintain a circumferential corresponding relationship between pairs of the radial arms 48 of the plates 38, 39 (and more specifically their fingers 49). To be more precise, in the embodiment of FIGS. 1 through 3 these rotational coupling means comprise at least one projection 76, here in the form of a peg, parallel to the common axis of the two coaxial parts 15, 16, fixed to one of the plates and inserted in a corresponding hole 77 in the other plate. As FIG. 3 shows, at least one such projection 76-hole 77 combination is provided between each pair of radial arms in corresponding relationship of the plates 38, 39. Also, where each plate comprises an even number of radial arms 48, projections 76 of this kind may be fixed (riveted or resistance welded, for example) to circumferentially alternate radial arms, the intervening radial arms being provided with the aforementioned corresponding holes 77. Thus the two plates 38, 39 are strictly identical as manufactured but can nevertheless be fitted together, as shown by FIG. 3, by offsetting one plate in the angular direction relative to the other so as to have the projections and the holes correspond.

In FIGS. 4 and 5, where analogous structural members carry the same reference numbers, the rotational coupling means consist of a ring 80, preferably of a plastics material, accommodated in the second part 16 and, to be more precise, mounted centered on the annular member 35 between the bearing surfaces 35a and 36a. It is provided with longitudinal ribs 81 on its outside surface, these ribs being inserted into corresponding cut-outs 82 in each plate. The cut-outs 82 are naturally arranged in such a way that the radial arms 48 of said plates 38, 39 face each other in pairs when said cut-outs are engaged on said ribs. The plates 38, 39 can slide along these ribs, when acted on by the Belleville washer 40, as the friction facings 45 wear down. This arrangement eliminates the risk of the plates digging into the annular member 35 which, protected in this way, can be made from a more economical material.

In another feasible embodiment the rotational coupling means for the two plates may consist in at least one of the Belleville washers featuring axial lugs at its inside and outside peripheries inserted in corresponding holes in the plate. This arrangement has the further advantage of centering said Belleville washer independently of the member 35, which reduces the risk of seizing up.

There is claimed:

1. Torsional damper device comprising coaxial first and second parts adapted to rotate relative to each other to a limited degree, two substantially parallel annular flanges and pivoted base members on said first part, two parallel plates on said second part disposed axially between said two flanges and having at least one pair of radial arms comprising parallel, substantially circumferential fingers, springs disposed substantially circumferentially between said base members, a surface on each base member opposite that in contact with the respective spring, rounded recesses in said surfaces in which said fingers engage on relative rotation between said two parts, rotational interlocking means for constraining said plates to rotate in unison together and adapted to establish a circumferential correspondence between said radial arms of said at least one pair and said fingers thereof, and said rotational interlocking means comprising at least one projection on one of said plates parallel to the common axis of said two parts and a corresponding hole in the other of said plates into which said projection is inserted.

2. Torsional damper device according to claim 1, wherein the pair or each pair of corresponding radial arms of said plates comprises at least one such projection and one such hole.

3. Torsional damper device according to claim 2, wherein each plate comprises an even number of radial arms and on each plate alternate arms comprise a projection and the arms between them comprise a hole.

4. Torsional damper device according to claim 1, further comprising spring means disposed between said two plates and respective parallel bearing surfaces on said second part against which said two plates are urged by said spring means to constitute a torque limiter.

5. Torsional damper device according to claim 4, further comprising friction facings between said plates and said bearing surfaces.

6. Torsional damper device comprising coaxial first and second parts adapted to rotate relative to each other to a limited degree, two substantially parallel annular flanges and pivoted base members on said first part, two parallel plates on said second part disposed axially between said two flanges and having at least one pair of radial arms comprising parallel, substantially circumferential fingers, springs disposed substantially circumferentially between said base members, a surface one each base member opposite that in contact with the respective spring, rounded recesses in said surfaces in which said fingers engage on relative rotation between said two parts, rotational interlocking means for constraining said plates to rotate in unison together and adapted to establish a circumferential correspondence between said radial arms of said at least one pair and said fingers thereof, and said rotational interlocking means comprising a ring on said second coaxial part on which said plates are slidably mounted, longitudinal ribs on an outside surface of said ring, and cut-outs along an inside circular edge of each of said plates corresponding to said ribs and arranged so that said radial arms of said at least one pair of arms on said plates face each other.

* * * * *